US012032501B2

(12) United States Patent
Landry et al.

(10) Patent No.: US 12,032,501 B2
(45) Date of Patent: Jul. 9, 2024

(54) CENTRAL PAYLOAD MANAGER FOR UNMANNED SYSTEMS

(71) Applicant: The Government of the United States of America, as represented by the Secretary of the Navy, Arlington, VA (US)

(72) Inventors: Blake J. Landry, Saint Martinville, LA (US); Charles R. Key, Diamondhead, MS (US); Edward F. Braithwaite, III, Covington, LA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 0 days.

(21) Appl. No.: 17/961,530

(22) Filed: Oct. 6, 2022

(65) Prior Publication Data

US 2023/0105074 A1     Apr. 6, 2023

Related U.S. Application Data

(60) Provisional application No. 63/253,094, filed on Oct. 6, 2021.

(51) Int. Cl.
*G06F 13/20*     (2006.01)
*B63G 8/38*     (2006.01)
*H04L 12/40*     (2006.01)

(52) U.S. Cl.
CPC ........ *G06F 13/20* (2013.01); *H04L 12/40013* (2013.01); *B63G 8/38* (2013.01); *G06F 2213/40* (2013.01); *H04L 2012/40273* (2013.01)

(58) Field of Classification Search
CPC ....................................................... G06F 1/163
See application file for complete search history.

(56) References Cited

U.S. PATENT DOCUMENTS 11,711,135 B1 * 7/2023 Gajjar ................ H04B 7/18513
370/316

* cited by examiner

*Primary Examiner* — Henry Tsai
*Assistant Examiner* — Juanito C Borromeo
(74) *Attorney, Agent, or Firm* — US Naval Research Laboratory; Nigel R. Fontenot (57) ABSTRACT

A central payload manager device may include a network switch, a central payload manager processing device, a plurality of connecting interfaces, a plurality of sensor processing devices connected to corresponding ones of the connecting interfaces and to the network switch, a cell modem or radio link connected to one or more of the connecting interfaces and to the network switch, a data storage device connected to the processing device, wherein the data storage device is configured to receive and store information from the plurality of sensor processing devices and from the cell modem or radio link via the network switch and the central payload manager processing device; and an iridium modem connecting to the central payload manager processing device and to a corresponding one of the connecting interfaces, wherein the iridium modem is configured to receive and transmit the stored information from the data storage device to an iridium antenna.

29 Claims, 12 Drawing Sheets

List of sensors that will connect to the central payload manager (CPM)

| Item | Description | Core Sensor | Group | ELECTRICAL INTERFACE ||||| MECHANICAL INTERFACE |||
|---|---|---|---|---|---|---|---|---|---|---|
| | | | | Voltage (VDC) | Max Current (A) | Power (W) | Sensor to Sensor SBC | Data Link to Exfil SBC | Connector (sensor cable) | Connector (fusion bulkhead) | Pinout |
| 1 | Radar | FURUNO DRS4DNXT | NRL | 12.0 | 2.500 | 30.0 | Ethernet | Ethernet | MCIL6M | MCBH6F | GENERIC |
| 2 | CTD | GPCTD Glider Payload CTD | NRL | 12.0 | 0.023 | 0.3 | RS232 | Ethernet | MCIL6M | MCBH6F | GENERIC |
| 3 | Acoustic Array | Custom Design | ARL PSU | 12.0 | 0.833 | 10.0 | Analog | Ethernet | MCIL6M | MCBH6F | CUSTOM |
| 4 | Camera System | FLIR M300C | NRL | 12.0 | 3.417 | 41.0 | Ethernet | Ethernet | MCIL6M | MCBH6F | GENERIC |
| 5 | Water Quality Sensor | SeaOWL UV-A | NRL | 12.0 | 0.100 | 1.2 | RS232 | Ethernet | MCIL6M | MCBH6F | GENERIC |
| | | | | | | | | | | | |
| | Examples | | | Voltage required by the payload sensor (e.g. 12VDC) | Max current pull of the payload sensor at the specified voltage (e.g. 1.24amp) | | Electrical interface for C2 and Data Access (e.g. ethernet, RS232, rs485) | | Termination of the cable that connects the sensor to the fusion payload at the fusion payload | Bulkhead connector available on the fusion payload for the sensors to connect to | |

FIG. 8

US 12,032,501 B2

CENTRAL PAYLOAD MANAGER FOR UNMANNED SYSTEMS

CROSS-REFERENCE

This Application is a nonprovisional application of and claims the benefit of priority under 35 U.S.C. § 119 based on U.S. Provisional Patent Application No. 63/253,094 filed on Oct. 6, 2021. The Provisional Application and all references cited herein is hereby incorporated by reference into the present disclosure in their entirety.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, DC 20375, USA; +1.202.767.7230; techtran@nrl.navy.mil, referencing Navy Case #210828.

TECHNICAL FIELD

The present disclosure is related to, and more specifically to, but not limited to a central payload manager device providing a hub that enables a unified C2 and data exfiltration interface for all connected subsystems including the host platform.

BACKGROUND

Existing popular uncrewed systems (UxS) include the Iver and Extended. Payload (EP).

The Extended Payload (EP) model is an open system AUV, which allows users to install their hardware and make software extensions to the vehicle without a custom design. The Iver3 EP includes a separate CPU, which allowing users to install their operating system, connecting to the added hardware. The disadvantages, however, include that these systems are non-transferable and required considerable amount of work.

Another existing system is the Triton. The Triton is an autonomous underwater and surface vehicle (AUSV) that allows for crafted niche payloads for specific application& The Triton, however, requires propriety interfaces.

Another existing system is the REMUS system. The REMUS system uses open architecture, which leverages a published subscribe database based on a Robotic Operating System (ROS) on a second processor. The "front seat" performs control functions using proprietary control software. The "back seat" performs mission tasks, data logging, and extensibility.

The inventors thus believe there is no unified C2 and data exfiltration interface for UxS, and there exists a need for one.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

Disclosed aspects provide for a central payload manager device. The central payload manager may include an extended body portion, a network switch disposed within the extended body portion, a central payload manager processing device disposed within the extended body portion, the central payload manager processing device being connected to the network switch, a face portion disposed at an end of the extended body portion, and a plurality of connecting interfaces extending from the face portion. The central payload manager may include one or more sensor processing devices connected to a corresponding one of the connecting interfaces and to the network switch, the one or more sensor processing devices configured to receive information from an associated sensor device via the corresponding connecting interface, a data storage device connected to the central payload manager processing device, wherein the data storage device is configured to receive and store information from the one or more sensor processing devices via the network switch and the central payload manager processing device, and an iridium modem, disposed within the extended body portion, the iridium modem connecting to the central payload manager processing device and to a corresponding one of the connecting interfaces, wherein the iridium modem is configured to receive, via the central payload manager processing device, at least a portion of the stored information from the data storage device and to transmit the portion of the stored information to an iridium antenna.

Disclosed aspects provide for a central payload manager device. The central payload manager may include a network switch disposed within the central payload manager device, a central payload manager processing device disposed within the central payload manager device, the central payload manager processing device being connected to the network switch, a plurality of connecting interfaces extending from the central payload manager device, and a plurality of sensor processing devices connected to corresponding ones of the connecting interfaces and to the network switch, the plurality of sensor processing devices configured to receive information from a corresponding sensor device via the corresponding connecting interface. The central payload manager may include a cell modem, disposed within the central payload manager device, connected to one or more of the connecting interfaces and to the network switch, wherein the cell modem is configured to communicate with the network switch independent of communicating with the central payload manager processing device, a data storage device connected to the processing device, wherein the data storage device is configured to receive and store information from the plurality of sensor processing devices and from the cell modem via the network switch and the central payload manager processing device, and an iridium modem, disposed within the central payload manager device, the iridium modem connecting to the central payload manager processing device and to a corresponding one of the connecting interfaces, wherein the iridium modem is configured to receive, via the central payload manager processing device, at least a portion of the stored information from the data storage device and to transmit the portion of the stored information to an iridium antenna, wherein the iridium modem is configured for low bandwidth data communication and the cell modem is configured for high bandwidth data communication.

Disclosed aspects provide for a central payload manager device. The central payload manager device may include an extended body portion, a network switch disposed within the extended body portion, a central payload manager processing device disposed within the extended body portion, the central payload manager processing device being connected to the network switch, and a face portion disposed at an end of the extended body portion. The central payload manager device may include a plurality of connecting interfaces extending from the face portion, a radar processing device connected to a corresponding one of the connecting interfaces and to the network switch, the radar processing device configured to receive information from a radar device via the corresponding connecting interface, and a sensor processing device connected to a corresponding one of the connecting interfaces and to the network switch, the sensor processing device configured to receive information from a sensor device via the corresponding connecting interface. The central payload manager device may include an acoustic processing device connected to a corresponding one of the connecting interfaces and to the network switch, the acoustic processing device configured to receive information from an acoustic array via the corresponding connecting interface, a camera processing device connected to a corresponding one of the connecting interfaces and to the network switch, the camera processing device configured to receive information from a camera device via the corresponding connecting interface, a data storage device connected to the processing device, wherein the data, storage device is configured to receive and store information from the radar processing device, the sensor processing device, the acoustic processing device, and the camera processing device via the network switch and the central payload manager processing device, and an iridium modem, disposed, within the extended body portion, the iridium modem connecting to the central payload manager processing device and to a corresponding one of the connecting interfaces, wherein the iridium modem is configured to receive, via the central payload manager processing device, at least a portion of the stored information from the data storage device and to transmit the portion of the stored information to an iridium antenna.

DETAILED DESCRIPTION

The aspects and features of the present aspects summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from, the scope of the present disclosure.

The future of naval missions will be carried out with teams of heterogeneous uncrewed systems (UxS). The CPM is designed to be platform agnostic and can rapidly be integrated into various UxS. The CPM enables a unified C2 and data exfiltration interface for all connected subsystems including the host platform which is important for a broad range of engineering, scientific, and defense applications. The CPM for unifying unmanned systems.

Disclosed embodiments provide for an agnostic host platform (UxS), providing a unified, common command & control, and data exfiltration interface for all connected systems/subsystems.

Figure 1:
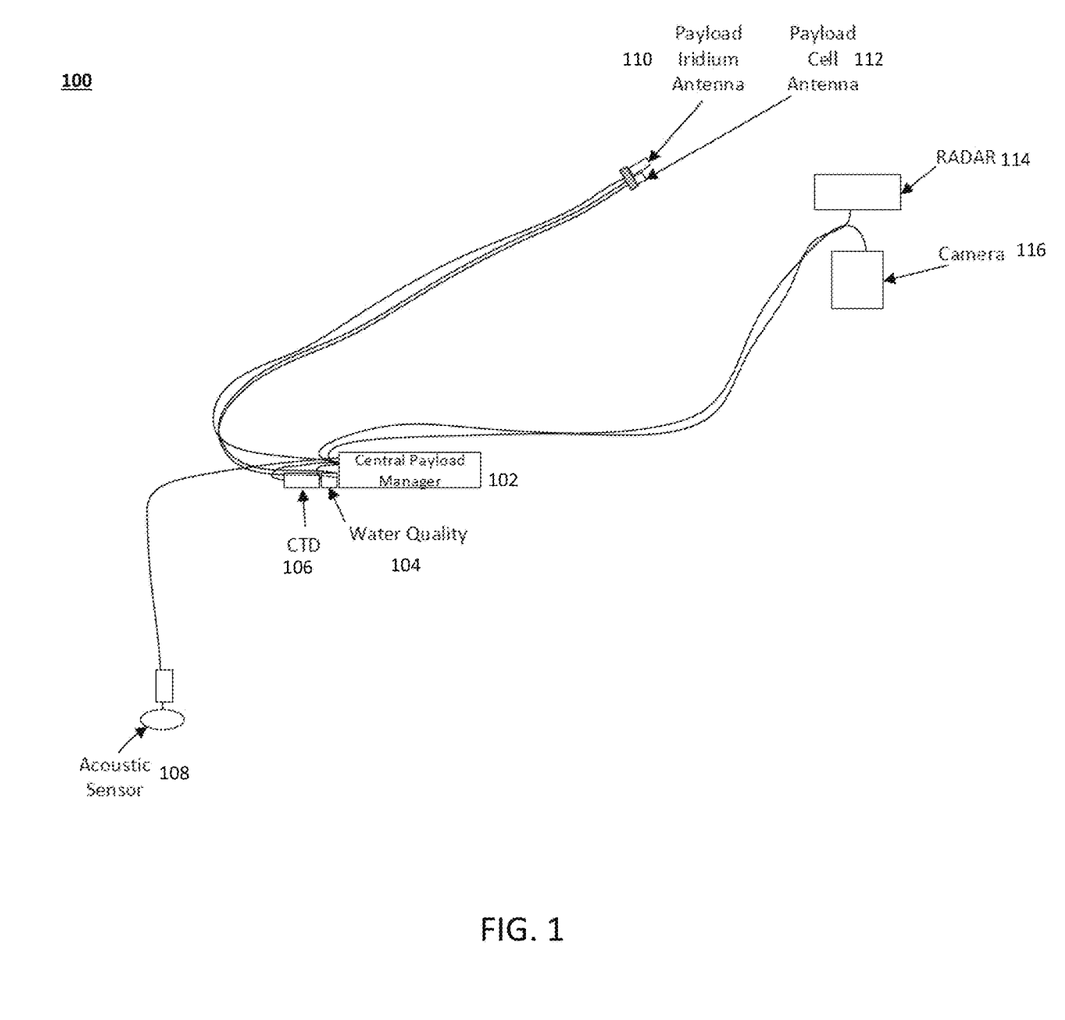
FIG. 1 illustrates an example system incorporating a central payload manager (CPM), in accordance with disclosed aspects.
Figure 7:
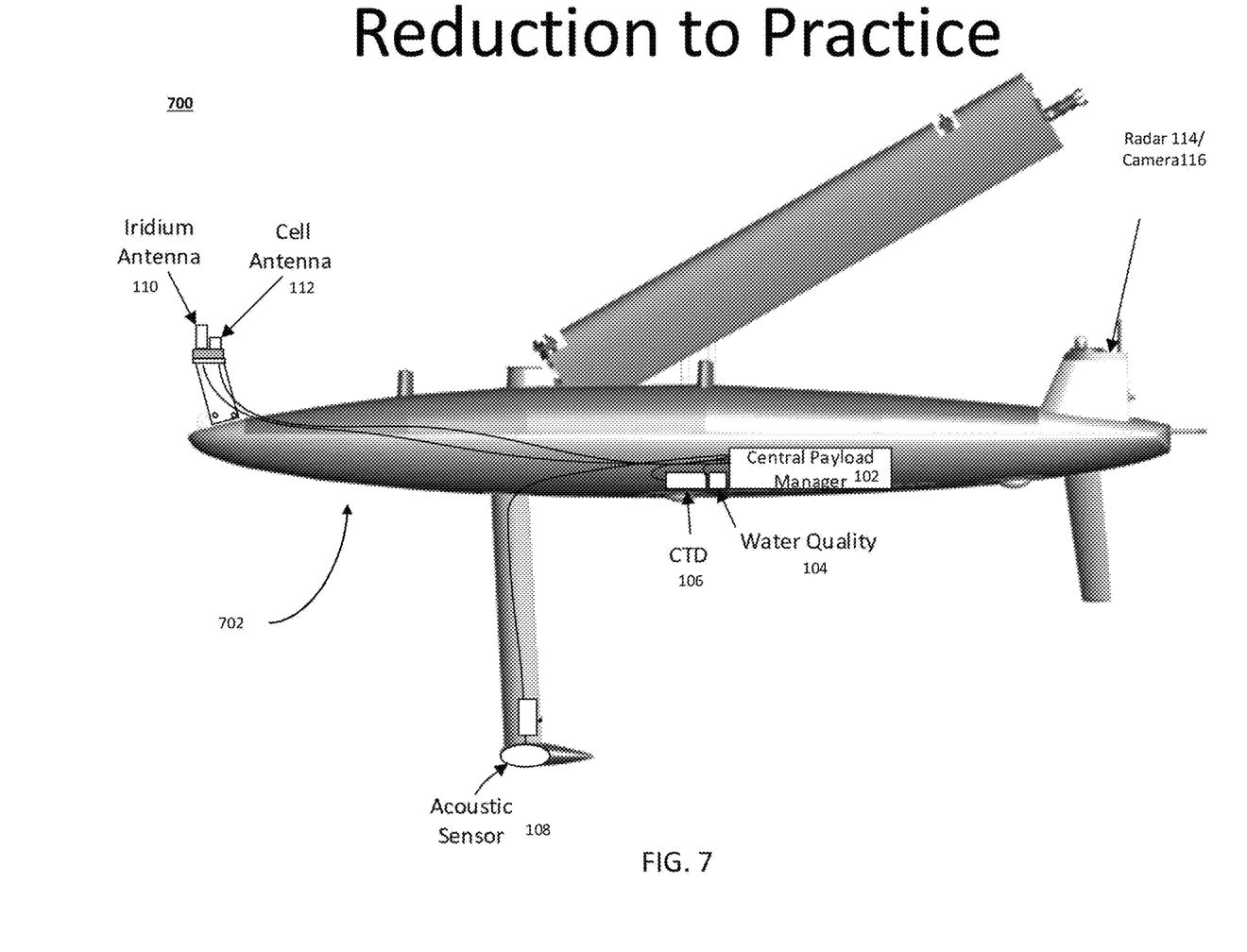
FIG. 7 illustrates an example reduction to practice system, in accordance with disclosed aspects.

FIG. 1 illustrates an example system 100 incorporating a central payload manager (CPM) 102 in accordance with disclosed aspects. System 100 may include the CPM 102, which provides a connection hub having a common interface for connected components. CPM 102 may include one or more connection nodes that allow CPM 102 to connect to additional components. System 100 may include one or more components that may be connectable to CPM 102. For example, system 100 may include one or more sensors, such as a water quality sensor 104, a Conductivity, Temperature, and Depth sensor (CTD) 106, and an acoustic sensor 108 (other sensors may be used in some embodiments). System 100 may include a payload iridium antenna 110, a payload cell antenna 112 (other antennas may be used in some embodiments such as a wireless mesh network radio antenna), a RADAR device 114, and a camera device 116. FIG. 7 illustrates an example reduction to practice system 700, where system 100 is connected to an unmanned vehicle (e.g., a triton vehicle).

CPM 102 provides a platform agnostic, unified, common interface for the host system and subsystems. CPM 102 provides the ability to rapidly integrate different platforms and sensors as well as implement command and control (C2) and data exfiltration. CPM 102 may be useful for system integrators, UxS operators, and military operations to support field efforts over a broad range of applications.

CPM 102 provides storage (individual and centralized) and data exfiltration independent from host platform (UxS). CPM 102 comprises a compact, modular system design that allows for ease of integration of both COTS subsystems and custom user payload systems as well as adaptable form factor. CPM 102 provides a networked-based architecture that allows for ease of inter-systems communications and data sharing.

Figure 2:
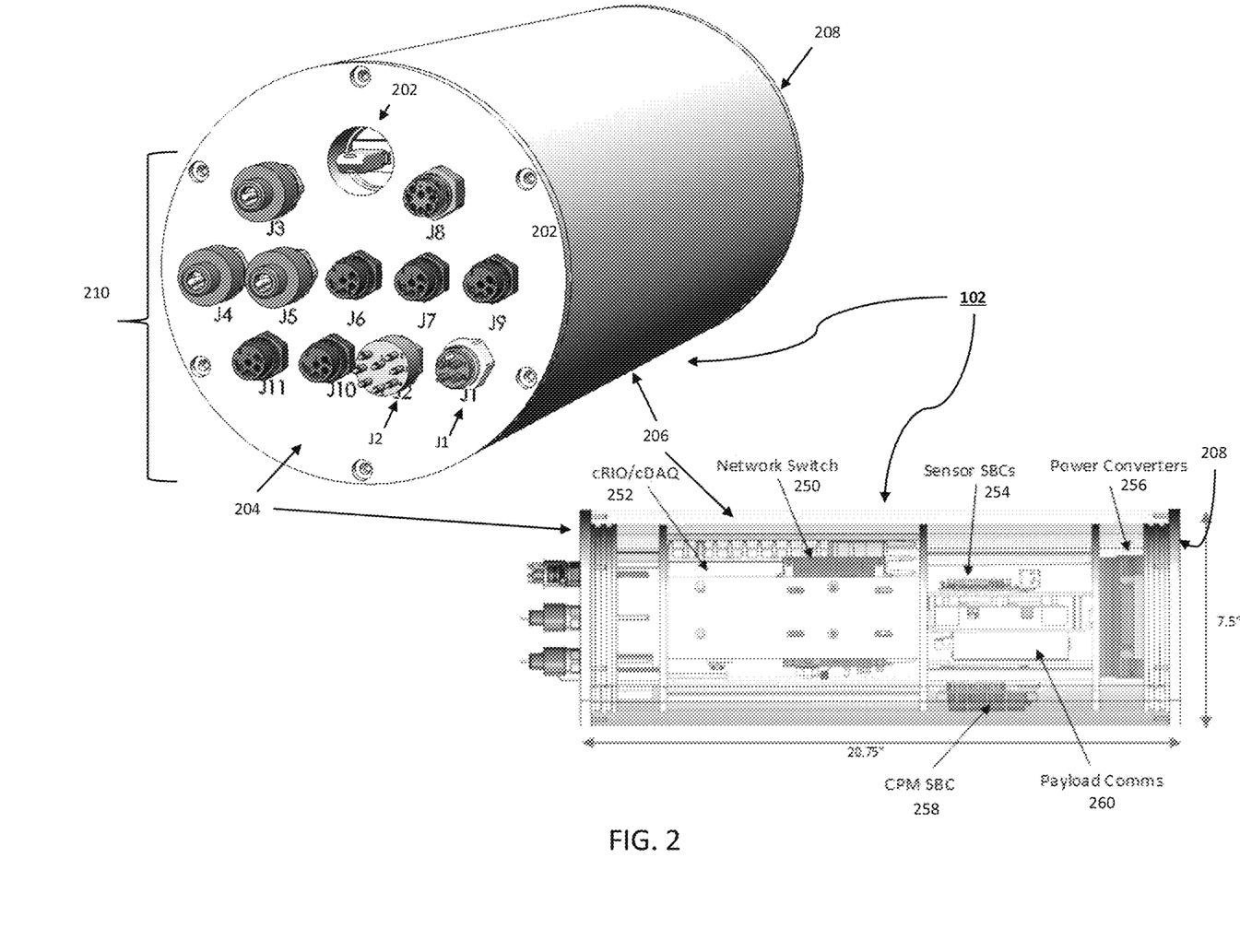
FIG. 2 illustrates front and side profile views of an exemplary CPM, in accordance with disclosed aspects.

FIG. 2 illustrates front and side profile views of an exemplary CPM in accordance with disclosed aspects. CPM 102 may have an elongated cylindrical tubular body 206, having a front face 204 and a back face 208. The body 206 may have one or more components on the inside of the body 206. The CPM 102 may be metal. The front face 204 may include one or more connecting interfaces 210 (example illustrates shows J1-J11) and a data storage interface 202, which may include a data storage device, data connection point, or the like. The connecting interfaces 210 may be connection points that may connect the CPM 102 to other components, sensors, devices, or the like. In some embodiments, the connecting interfaces 210 may be bulkhead connectors or the like. The connecting interfaces 210 may extend from the front face 204, and may connect to one or more components inside the body 206. As shown, the body may contain a network switch 250, sensor SBCs (single board computer) 254, power converters 256, cRIO/cDAQ 252, CPM SBC 258, and payload comms 260. CPM 102 may be metal, and may in one embodiment, be about 20.75 inches long and have a face 204/108 having a diameter of 7.5 inches, however, other configurations are possible.

Figure 3A:
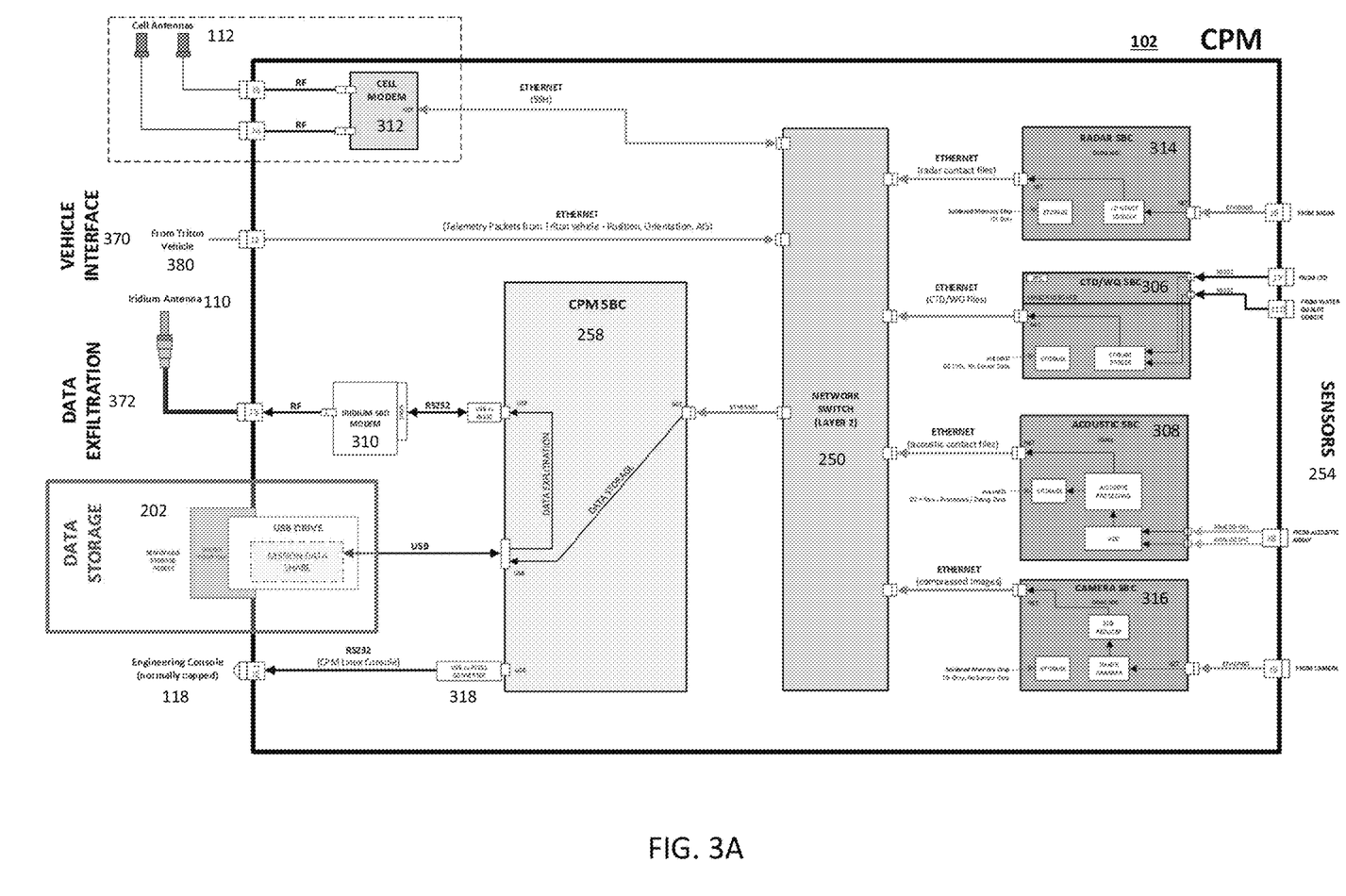
FIGS. 3A-E illustrate exemplary schematic diagrams of a CPM and its components in accordance with disclosed aspects.
Figure 3B:
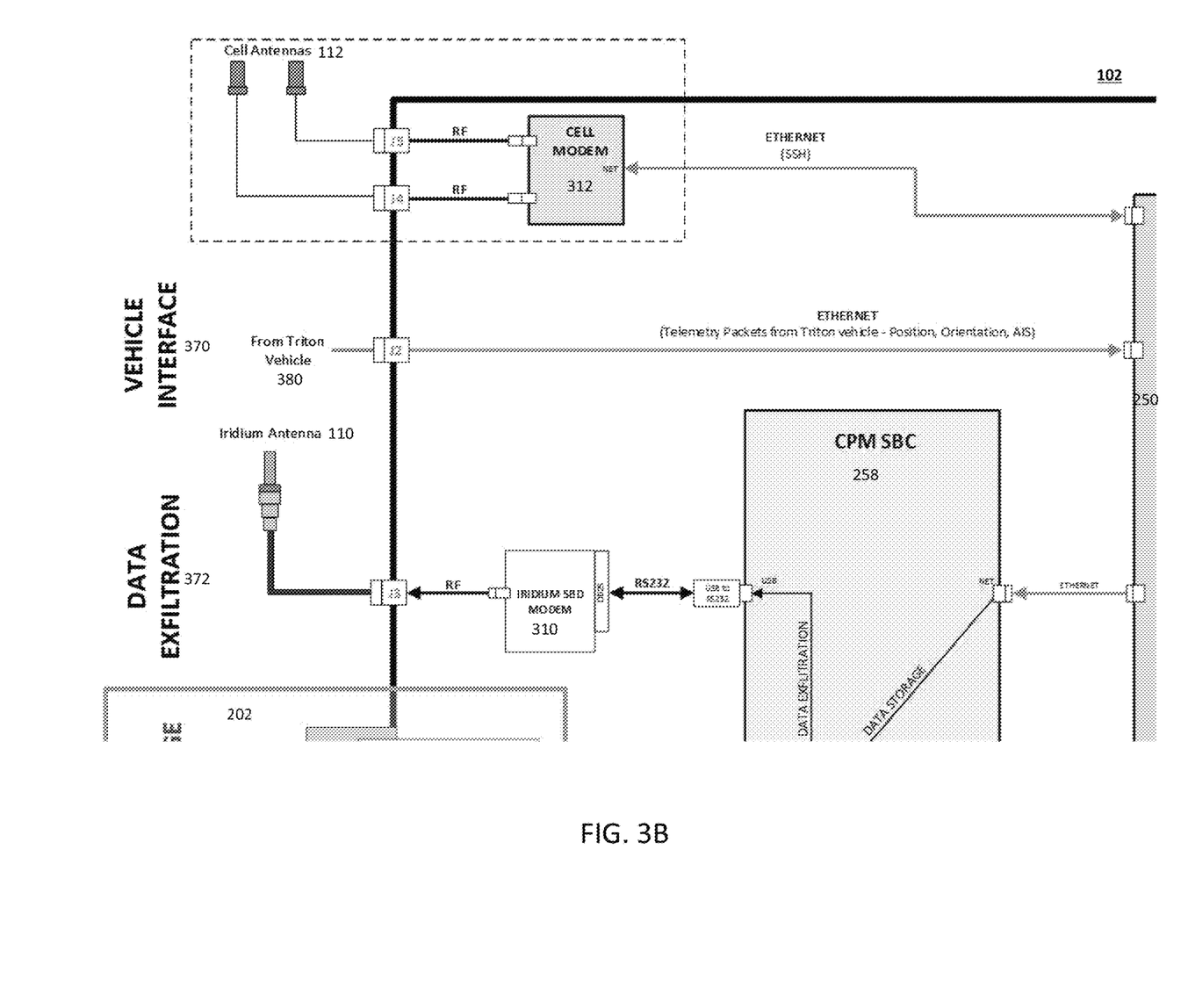
Figure 3C:
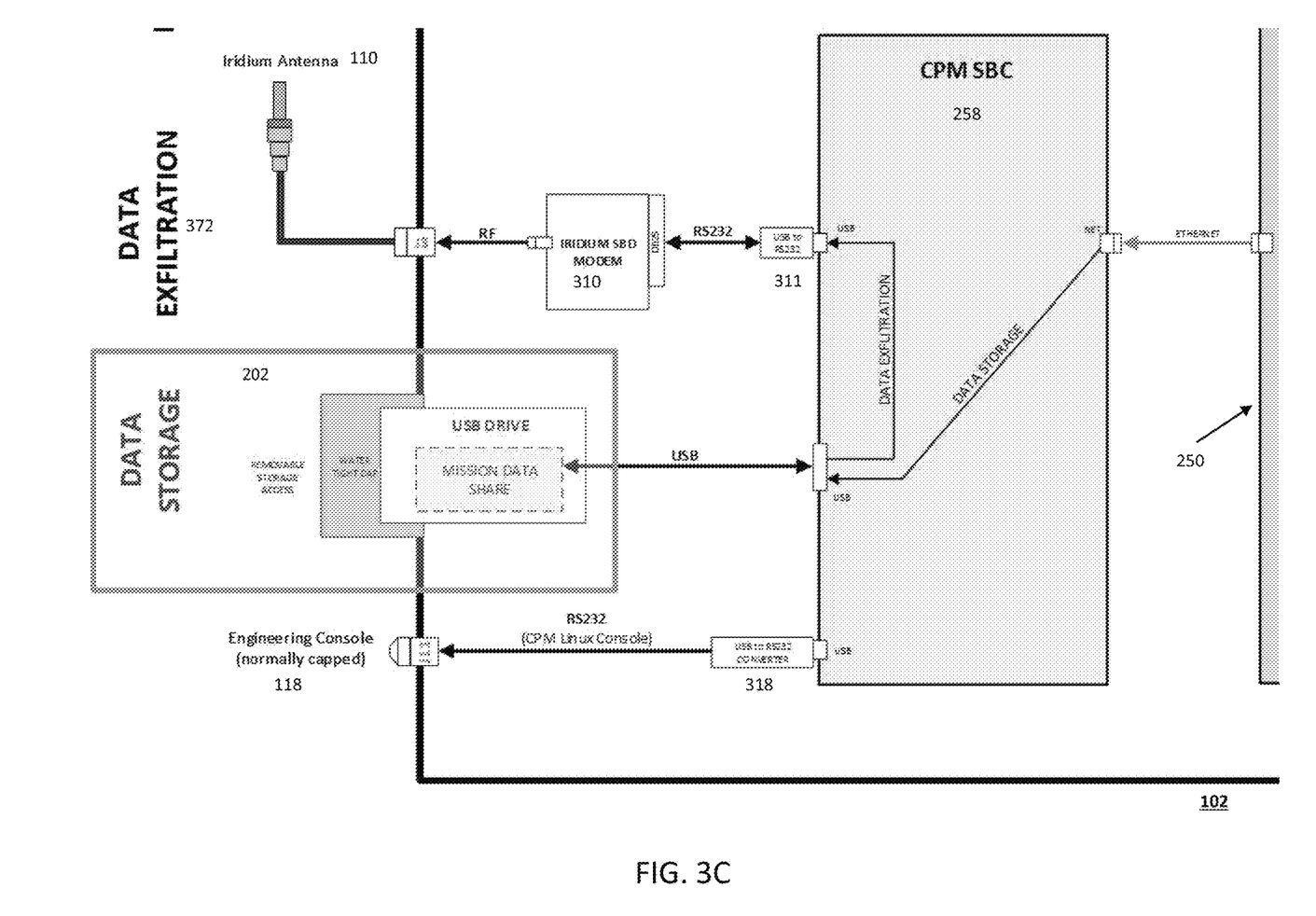
Figure 3D:
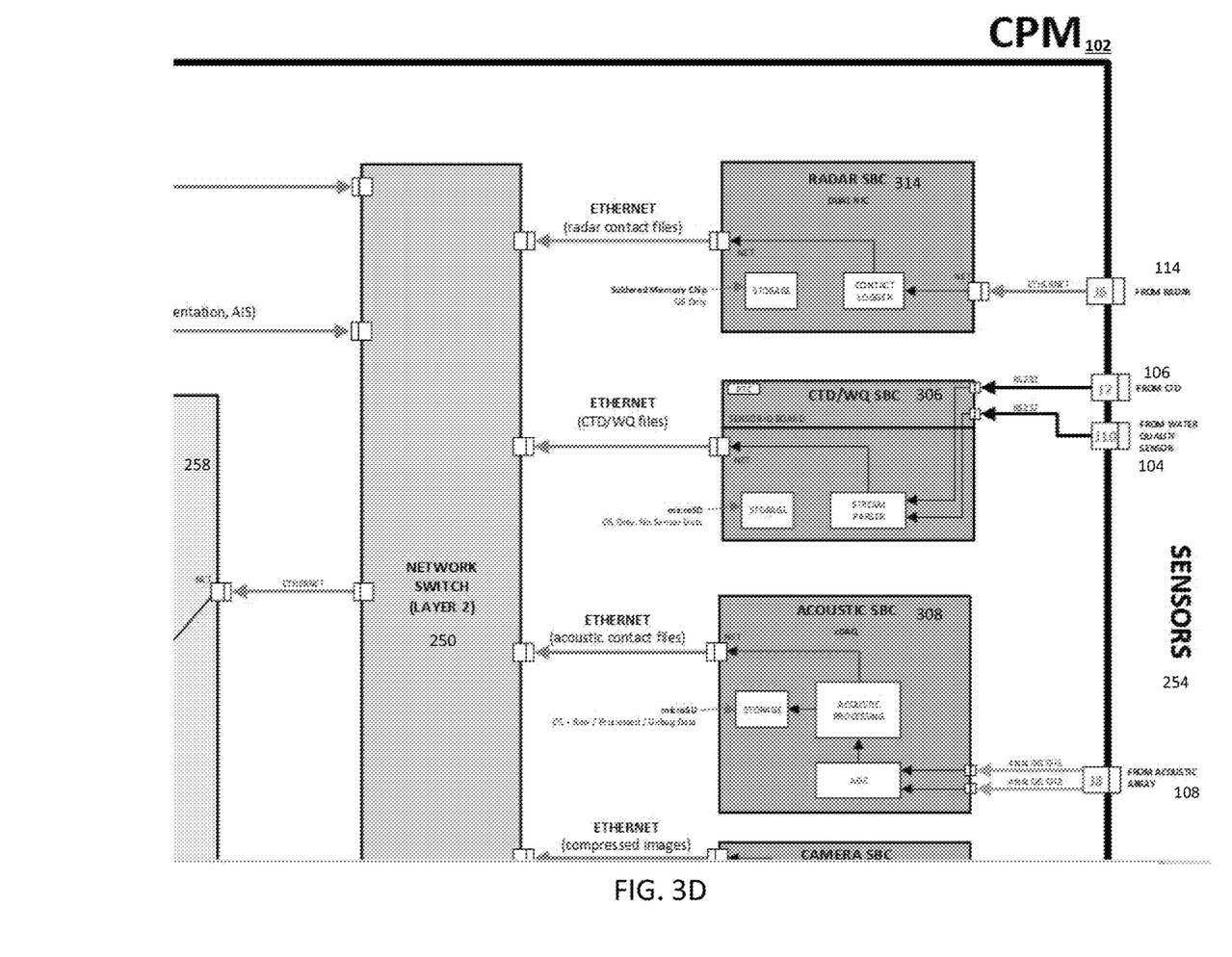
Figure 3E:
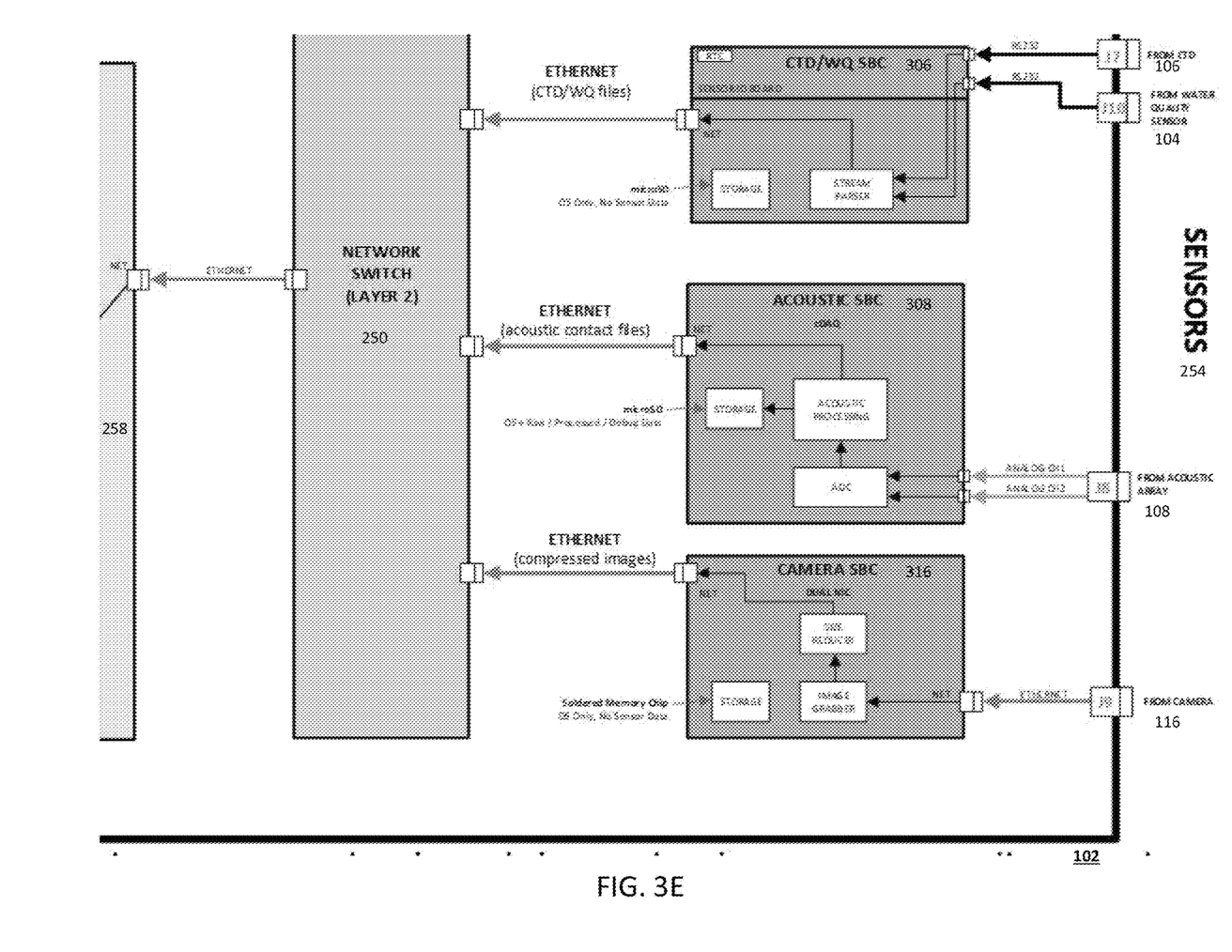

FIGS. 3A-E illustrate exemplary schematic diagrams of a CPM and its components in accordance with disclosed aspects. FIG. 3A illustrates an exemplary CPM 102, with FIGS. 3B-3E each showing a closer view of portions of FIG. 3A. The connections and/or coupling may be data connections, physical connections, and/or the like.

As shown, one or more antennas 112 (e.g., cell antennas, receiving devices, etc.) may connect and/or couple to J5 and/or J4, which may connect via an RF channel to a modem device 312 (e.g., cell modem, wireless mesh, network radio, or the like). The modem 312 may connect (e.g., via Ethernet (SSH)) to the network switch 250.

J2 may connect to a vehicle interface 370. For example, the vehicle interface may be from a vehicle, such as a Triton vehicle 380. Information, such as telemetry packets from the Triton vehicle 380 may be transmitted to the network switch 250. This information may include position, orientation, Automatic Identification System (AIS), and/or the like. AIS data may be used to track the geolocation of a marine vessel or the like. J1 (not shown in this figure) may also connect to the vehicle interface 370 and/or may provide power to CPM 102 (e.g., via one or more power terminals and/or devices that may be inside the CPM 102).

J3 may connect to a data exfiltration interface 372, which could be an antenna, satellite system, and/or the like. For example, J3 may connect to an Iridium antenna 110. J3 may connect, via an RF channel, to a modem 310, such as an Iridium SBD modem. The modem 310 may connect (e.g., via USB, or the like) to CPM SBC 258, which may provide for a connection (e.g., data exfiltration channel) between the data storage device 202 and the modem 310 and/or antenna 110. Data storage device 202 may, in some embodiments, include a USB drive, a data share (e.g., network/mission data share), or the like. The network/mission share may be the location for file handoff between the sensor payloads and the payload manager as well general use. Data storage device 202 may be a removable storage device, and may have a water tight cap. The data that may be provided from the data storage device 202 to the modem 310 and/or antenna 110 may be derived from one or more sensors connected to CPM 102, such as described herein. Sensor payloads may have access to the network share in addition to any onboard SBD storage.

J11 may connect to an engineering console 118. In some embodiments, J11 may be normally capped, such as when not in use. J11 may connect via RS232 converter (CPM Linux Console) via USB to CPM SBC 258. CPM SBC 258 may connect to the network switch 250, such as via an Ethernet connection.

J6 may connect to Radar 114. J6 may connect, such as via Ethernet, to a Radar SBC 314, which may contain a contact logger and a storage device (e.g., memory chip, or the like). In some embodiments, information from the Radar 114 may be transmitted to the Radar SBC 314, such as to the contact logger. The Radar SBC 314 may transmit, such as via Ethernet, information (e.g., radar contact files) to the network switch 250. In some embodiments, the radar contact files may be stored on a storage device of the Radar SBC 314.

J7 may connect to CTD 106. J10 may connect to water sensor 104 (e.g., water quality sensor). J7 and J10 may connect (e.g., via RS232 device) to CTD/WQ SBC 306, which may contain a stream parser and a storage device. In some embodiments, information from the CTD and/or the water sensor 104 may be transmitted to the CTD/WQ SBC 306, such as to the stream parser. The CTD/WQ 306 may transmit, such as via Ethernet, information (e.g., CTD files, water quality files, or the like) to network switch 250. In some embodiments, the CTD/WQ files may be stored on a storage device of the CTD/WQ SBC 306.

J8 may connect to the acoustic array 108. J8 may connect (e.g., via one or more analog channels) to Acoustic SBC 308, which may contain an analog-to-digital converter, an acoustic processing device, and a storage device. In some embodiments, information from the acoustic array 108 may be transmitted to the acoustic SBC 308, such as to the analog-to-digital converter. The acoustic SBC 308 may transmit information (e.g., acoustic contact files), such as via Ethernet, to network switch 250. In some embodiments, the acoustic contact files may be stored on a storage device of the acoustic SBC 308.

J9 may connect to camera 116. J9 may connect (e.g., via Ethernet) to camera SBC 316, which may include an image grabber, a size reducer, and a storage device. In some embodiments, information from the camera 116 may be transmitted to the camera SBC 316, such as to the image grabber. The camera SBC 316 may transmit information (e.g., images, compressed images, or the like), such as via Ethernet, to the network switch 250. In some embodiments, the images may be stored on a storage device of the camera SBC 316.

According to some aspects, the Ethernet switch 350 may transmit information, such as files received from SBCs 314, 306, 308, and/or 316, to the CPM SBC 258. The CPM SBC 250 may transmit this received information to the storage device 202. The data that may be provided from the data storage device 202 to the modem 310 and/or antenna 110 may be derived from one or more sensors connected to CPM 102, such as described above and herein.

Figure 4:
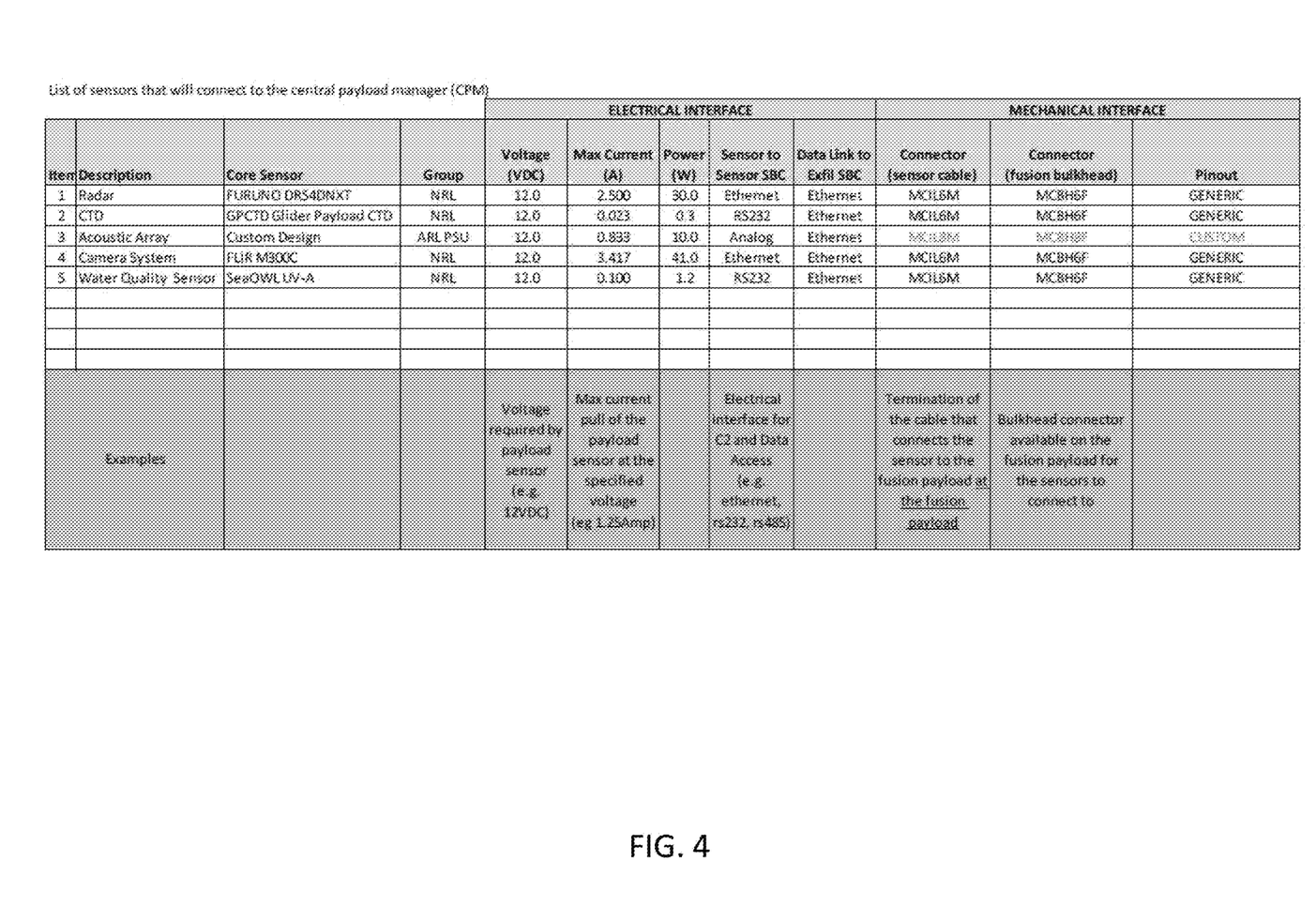
FIG. 4 illustrates example sensors/components and associated descriptions, in accordance with disclosed aspects.

Examples of sensors/components and associated descriptions can be seen in FIG. 4.

Figure 5:
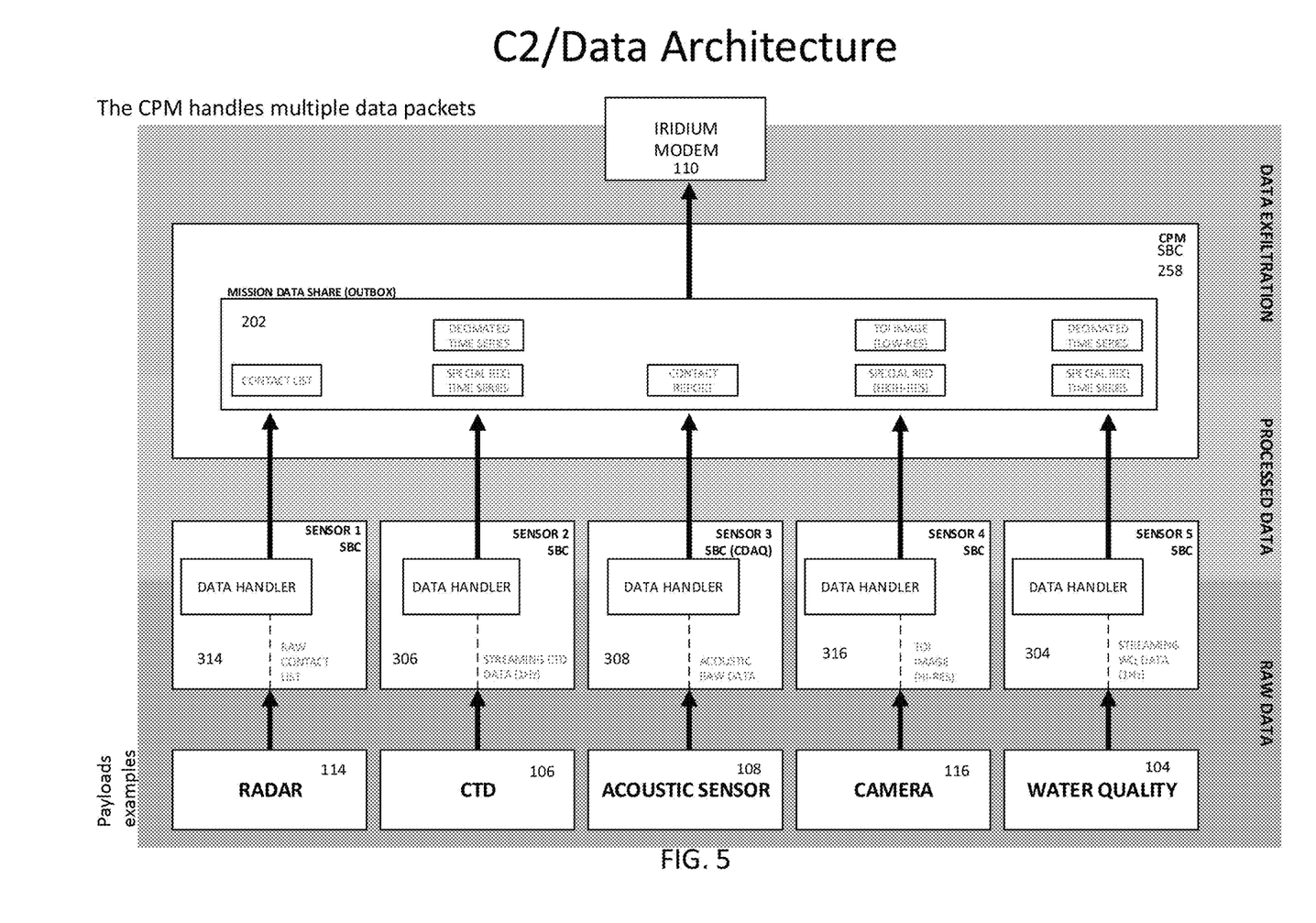
FIG. 5 illustrates a schematic flow diagram of an example process, in accordance with disclosed aspects.

FIG. 5 shows a schematic flow diagram of a process 500 in accordance with disclosed aspects. As shown, sensor data (e.g., data from RADAR 114, CTD 106, acoustic sensor 108, camera 116, water quality 104, and/or the like) may provide payload data to a corresponding SBC (e.g., SBC 314, 306, 308, 316, 304, and/or the like). In some embodiments, the SBC may correspond to a specific sensor. In some embodiments, an SBC may receive data from more than one sensor. For example, as shown in FIG. 5, the water quality sensor 104 may transmit data to a corresponding SBC 304, where the SBC 306 in FIG. 3 receives information from water quality sensor 104 as well as from CTD 106. The SBC(s) can provide the information to a storage device 202, such as to the mission data share. The CPM SBC 258 can then transmit the data to the modem 110. In some embodiments, an SBC might not be connected to a sensor (e.g., serves as internal specialized processing subsystem). For example, the specialized processing subsystem may be used to process data collected from one or more other SBCs.

Figure 6:
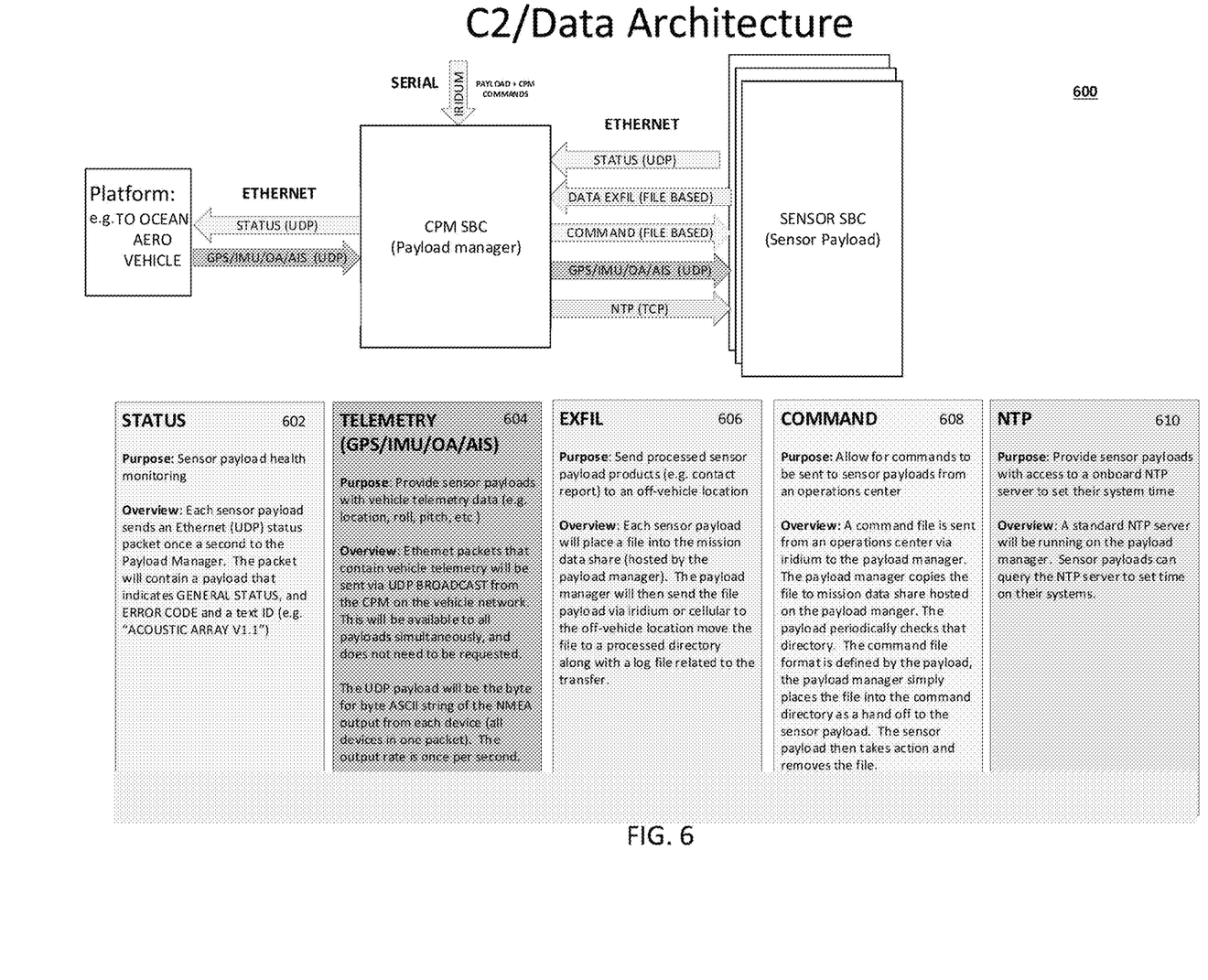
FIG. 6 illustrates a schematic flow diagram of an example process, in accordance with disclosed aspects.

FIG. 6 shows a schematic flow diagram of a process 600 in accordance with disclosed aspects. The process 600 may describe an example onboard communication protocol associated with the CPM 102. The status 602 may provide sensory payload health monitoring. Each sensor payload may send an Ethernet (UDP, etc.) status packet once a second to the payload manager. The packet may contain a payload that may indicate general status, error code, text ID (e.g., "Acoustic Array V1.1"), and/or the like. The status may be transmitted from the sensor to the sensor SBC to the CPM SBC (e.g., payload manager) to the platform (e.g., to the vehicle).

The telemetry 604 may be GPS, IMU, OA, and/or AIS based. Telemetry 604 may provide sensor payload with vehicle telemetry data (e.g., location, roll, pitch, etc.) Ethernet packets may contain vehicle telemetry. These packets may be sent via. UDP broadcast from the CPM 102 on the vehicle network. This may be available to payloads simultaneously, and might not need to be requested in some embodiments. The UDP payload may be the byte for byte ASCII string of the NMEA output from each device (e.g., all devices in one packet). The output rate may be once per section.

The exfil 606 may include sending processed sensor payload products (e.g., contact report) to an off-vehicle location. Each sensor payload may place a file into the mission data share (e.g., hosed by the payload manager). The payload manager may send the file payload via Iridium or cellular to the off-vehicle location and may move the file to a processed directory along with a log file related to the transfer.

The command 608 may allow for commands to be sent to sensor payloads from an operations center, for example. The command file may be sent from an operations center via Iridium to the payload manager. The payload manager may copy the file to mission data share hosted by the payload manager. The payload may periodically check the directory. The command file format may be defined by the payload. The payload manager may place the file into the command directory as a hand off to the sensor payload. The sensor payload may take action and remove the file.

The NTP 610 may provide sensor payloads with access to an onboard NTP server to set their system time. An NTP server may be running on the payload manager. Sensor payloads can query the NTP server to set time on their systems.

Figure 8:
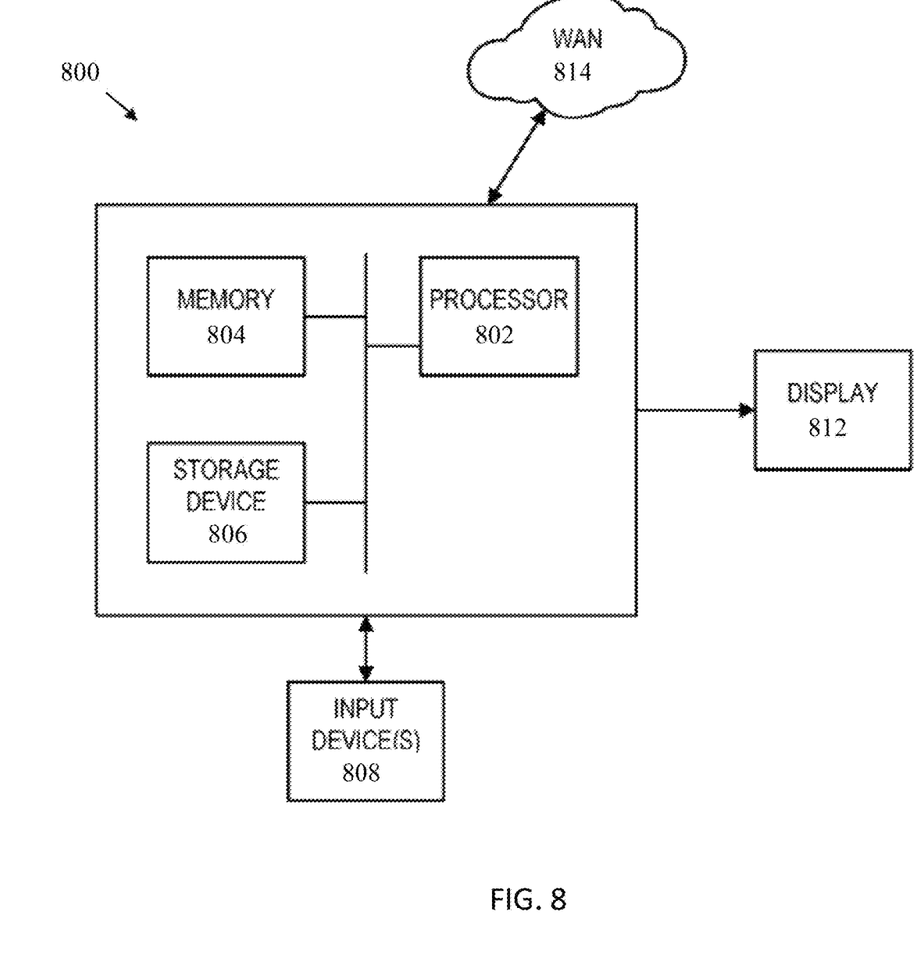
FIG. 8 illustrates an example computer system, in accordance with disclosed aspects.

One or more aspects described herein may be implemented on virtually any type of computer regardless of the platform being used. For example, as shown in FIG. 8, a computer system 800 includes a processor 802, associated memory 804, a storage device 806, and numerous other elements and functionalities typical of today's computers (not shown). The computer 800 may also include input means 808, such as a keyboard and a mouse, and output means 812, such as a monitor or LED. The computer system 800 may be connected to a local may be a network (LAN) or a wide may be a network (e.g., the Internet) 814 via a network interface connection (not shown). Those skilled in the art will appreciate that these input and output means may take other forms.

Further, those skilled in the art will appreciate that one or more elements of the aforementioned computer system 800 may be, located at a remote location and connected to the other elements over a network. Further, the disclosure may be implemented on a distributed system having a plurality of nodes, where each portion of the disclosure (e.g., real-time instrumentation component, response vehicle(s), data sources, etc.) may be located on a different node within the distributed system. In one embodiment of the disclosure, the node corresponds to a computer system. Alternatively, the node may correspond to a processor with associated physical memory. The node may alternatively correspond to a processor with shared memory and/or resources. Further, software instructions to perform embodiments of the disclosure may be stored on a computer-readable medium (i.e., a non-transitory computer-readable medium) such as a compact disc (CD), a diskette, a tape, a file, or any other computer readable storage device. The present, disclosure provides for a non-transitory computer readable medium comprising computer code, the computer code, when executed by a processor, causes the processor to perform aspects disclosed herein.

Embodiments for a central payload manager device that CPM enables a unified C2 and data exfiltration interface for all connected subsystems including the host platform been described. Although particular embodiments, aspects, and features have been described and illustrated, one skilled in the art may readily appreciate that the aspects described herein are not limited to only those embodiments, aspects, and features but also contemplates any and all modifications and alternative embodiments that are within the spirit and scope of the underlying aspects described and claimed herein. The present application contemplates any and all modifications within the spirit and scope of the underlying aspects described and claimed herein, and all such modifications and alternative embodiments are deemed to be within the scope and spirit of the present disclosure.

What is claimed is:

1. A central payload manager device, comprising:
an extended body portion;
a network switch disposed within the extended body portion;
a central payload manager processing device disposed within the extended body portion, the central payload manager processing device being connected to the network switch;
a face portion disposed at an end of the extended body portion;
a plurality of connecting interfaces extending from the face portion;
one or more sensor processing devices connected to a corresponding one of the connecting interfaces and to the network switch, the one or more sensor processing devices configured to receive information from an associated sensor device via the corresponding connecting interface;
a data storage device connected to the central payload manager processing device, wherein the data storage device is configured to receive and store information from, the one or more sensor processing devices via the network switch and the central payload manager processing device; and
an iridium modem, disposed within the extended body portion, the iridium modem connecting to the central payload manager processing device and to a corresponding one of the connecting interfaces, wherein the iridium modern is configured to receive, via the central payload manager processing device, at least a portion of the stored information from the data storage device and to transmit the portion of the stored information to an iridium antenna.

2. The central payload manager of claim 1, further comprising a cell modem, disposed within the extended body portion, connected to one or more of the connecting interfaces and to the network switch.

3. The central payload manager of claim 2, wherein the iridium modem is configured for low bandwidth data communication and the cell modem is configured for high bandwidth data communication, wherein the cell modem is configured for transmitting information from the network switch to a cell antenna.

4. The central payload manager of claim 2, wherein the cell modem is connected to the corresponding one or more connecting interfaces via one or more RF channels, and the iridium antenna is connected to the corresponding connecting interface via an RF channel.

5. The central payload manager of claim 2, wherein the cell modem is configured to communicate with the network switch independent of communicating with the central payload manager processing device.

6. The central payload manager of claim 1, further comprising a wireless mesh network radio, disposed within the extended body portion, connected to one or more of the connecting interfaces and to the network switch.

7. The central payload manager of claim 6, wherein the iridium modem is configured for low bandwidth data communication and the wireless mesh network radio is configured for high bandwidth data communication, wherein the wireless mesh network radio is configured for transmitting information from the network switch to a receiving device.

8. The central payload manager of claim 6, wherein the wireless mesh network radio is configured to communicate with the network switch independent of communicating with the central payload manager processing device.

9. The central payload manager of claim 1, wherein the iridium modem is configured for low bandwidth data communication.

10. The central payload manager of claim 1, wherein the central payload manager processing device is connected to the network switch via an Ethernet connection.

11. The central payload manager of claim 1, wherein the plurality of connecting interfaces comprises at least one bulkhead connector.

12. The central payload manager of claim 1, wherein the network switch is configured to receive, via one of the connecting interfaces, data from a vehicle.

13. The central payload manager of claim 12, wherein the vehicle is an uncrewed vehicle.

14. The central payload manager of claim 12, wherein the data from the vehicle comprises position, orientation, or Automatic Identification System (AIS) data associated with the vehicle.

15. The central payload manager of claim 12, wherein the data from the vehicle is received by the network switch independent of communicating with the central payload manager.

16. The central payload manager of claim 15,
wherein the data storage device is configured to receive and store the data from the vehicle via the network switch and the central payload manager processing device; and
wherein the iridium modem is configured to receive, via the central payload manager processing device, the stored data from the vehicle from the data storage device and transmit the stored data from the vehicle to the iridium antenna.

17. The central payload manager of claim 1,
wherein the one or more sensor processing devices comprises a radar processing device connected to a corresponding one of the connecting interfaces and to the network switch, the radar processing device configured to receive information from a radar device via the corresponding connecting interface;
wherein the data storage device is configured to receive and store information from the radar processing device via the network switch and the central payload manager processing device.

18. The central payload manager of claim 1,
wherein the one or more sensor processing devices comprises an acoustic processing device connected to a corresponding one of the connecting interfaces and to the network switch, the acoustic processing device configured to receive information from an acoustic array via the corresponding connecting interface;
wherein the data storage device is configured to receive and store information from the acoustic processing device via the network switch and the central payload manager processing device.

19. The central payload manager of claim 1,
wherein the one or more sensor processing devices comprises a camera processing device connected to a corresponding one of the connecting interfaces and to the network switch, the acoustic processing device configured to receive information from a camera device via the corresponding connecting interface;
wherein the data storage device is configured to receive and store information from the camera processing device via the network switch and the central payload manager processing device.

20. A central payload manager device, comprising:
a network switch disposed within the central payload manager device;
a central payload manager processing device disposed within the central payload manager device, the central payload manager processing device being connected to the network switch;
a plurality of connecting interfaces extending from the central payload manager device;
a plurality of sensor processing devices connected to corresponding ones of the connecting interfaces and to the network switch, the plurality of sensor processing devices configured to receive information from a corresponding sensor device via the corresponding connecting interface;
a cell modem, disposed within the central payload manager device, connected to one or more of the connecting interfaces and to the network switch, wherein the cell modem is configured to communicate with the network switch independent of communicating with the central payload manager processing device;
a data storage device connected to the processing device, wherein the data storage device is configured to receive and store information from the plurality of sensor processing devices and from the cell modem via the network switch and the central payload manager processing device; and
an iridium modem, disposed within the central payload manager device, the iridium modem connecting to the central payload manager processing device and to a corresponding one of the connecting interfaces, wherein the iridium modem is configured to receive, via the central payload manager processing device, at least a portion of the stored information from the data storage device and to transmit the portion of the stored information to an iridium antenna, wherein the iridium modem is configured for low bandwidth data communication and the cell modem is configured for high bandwidth data communication.

21. The central payload manager of claim 20, wherein the cell modem is connected to the corresponding one or more connecting interfaces via one or more RF channels, and the iridium antenna is connected to the corresponding connecting interface via an RF channel.

22. The central payload manager of claim 20, wherein the central payload manager processing device is connected to the network switch via an Ethernet connection.

23. The central payload manager of claim 20, wherein the plurality of connecting interfaces comprises at least one bulkhead connector.

24. The central payload manager of claim 20, wherein the network switch is configured to receive, via one of the connecting interfaces, data from a vehicle.

25. The central payload manager of claim 24, wherein the data from the vehicle comprises position, orientation, or Automatic Identification System (AIS) data associated with the vehicle.

26. The central payload manager of claim 24, wherein the data from the vehicle is received by the network switch independent of communicating with the central payload manager.

27. A central payload manager device, comprising:
an extended body portion;
a network switch disposed within the extended body portion;
a central payload manager processing device disposed within the extended body portion, the central payload manager processing device being connected to the network switch;
a face portion disposed at an end of the extended body portion;
a plurality of connecting interfaces extending from the face portion;
a radar processing device connected to a corresponding one of the connecting interfaces and to the network switch, the radar processing device configured to receive information from a radar device via the corresponding connecting interface;
a sensor processing device connected to a corresponding one of the connecting interfaces and to the network switch, the sensor processing device configured to receive information from a sensor device via the corresponding connecting interface;
an acoustic processing device connected to a corresponding one of the connecting interfaces and to the network switch, the acoustic processing device configured to receive information from an acoustic array via the corresponding connecting interface;
a camera processing device connected to a corresponding one of the connecting interfaces and to the network switch, the camera processing device configured to receive information from a camera device via the corresponding connecting interface;
a data storage device connected to the processing device wherein the data storage device is configured to receive and store information from the radar processing device, the sensor processing device, the acoustic processing device, and the camera processing device via the network switch and the central payload manager processing device; and
an iridium modem, disposed within the extended body portion, the iridium modem connecting to the central payload manager processing device and to a corresponding one of the connecting interfaces, wherein the iridium modem is configured to receive, via the central payload manager processing device, at least a portion of the stored information from the data storage device and to transmit the portion of the stored information to an iridium antenna.

28. The central payload manager of claim 27, further comprising a cell modem, disposed within the extended body portion, connected to one or more of the connecting interfaces and to the network switch.

29. The central payload manager of claim 27, further comprising a wireless mesh network radio, disposed within the extended body portion, connected to one or more of the connecting interfaces and to the network switch.

* * * * *